(12) United States Patent
Cauchie et al.

(10) Patent No.: US 8,873,376 B2
(45) Date of Patent: Oct. 28, 2014

(54) METHOD OF OBTAINING INFORMATION REPRESENTATIVE OF AN AVAILABILITY, A DEVICE FOR OBTAINING INFORMATION, AND A CORRESPONDING COMPUTER PROGRAM

(75) Inventors: Gregory Cauchie, Antony (FR); Marc Capelle, Chilly-Mazarin (FR); Frédéric Fourneau, La Plaine Saint Denis (FR)

(73) Assignee: France Telecom, Paris (FR)

(*) Notice: Subject to any disclaimer, the term of this patent is extended or adjusted under 35 U.S.C. 154(b) by 561 days.

(21) Appl. No.: 12/823,808

(22) Filed: Jun. 25, 2010

(65) Prior Publication Data

US 2010/0329138 A1 Dec. 30, 2010

(30) Foreign Application Priority Data

Jun. 25, 2009 (FR) ..................................... 09 54361

(51) Int. Cl.
*G01R 31/08* (2006.01)
*G06F 11/00* (2006.01)
*H04L 12/28* (2006.01)
*G06F 15/173* (2006.01)
*H04L 12/751* (2013.01)
*H04L 12/26* (2006.01)
*H04L 12/701* (2013.01)
*H04L 12/721* (2013.01)
*H04L 12/757* (2013.01)

(52) U.S. Cl.
CPC ................ *H04L 12/26* (2013.01); *H04L 45/02* (2013.01); *H04L 45/00* (2013.01); *H04L 45/70* (2013.01); *H04L 43/00* (2013.01); *H04L 45/023* (2013.01)

USPC ........... 370/218; 370/235; 370/252; 370/392; 709/223; 709/230; 709/238; 709/242

(58) Field of Classification Search
USPC .......... 370/218, 389, 392, 252, 235; 709/227, 709/239, 242, 244, 223, 230, 238
See application file for complete search history.

(56) References Cited

U.S. PATENT DOCUMENTS

| 2002/0039352 A1* | 4/2002 | El-Fekih et al. ............... 370/252 |
| 2006/0209716 A1* | 9/2006 | Previdi et al. ................. 370/254 |
| 2007/0112963 A1* | 5/2007 | Dykes et al. .................. 709/227 |
| 2007/0160061 A1* | 7/2007 | Vasseur et al. ............. 370/395.4 |
| 2008/0123532 A1* | 5/2008 | Ward et al. .................... 370/238 |
| 2009/0122797 A1* | 5/2009 | Thubert et al. ................ 370/392 |

OTHER PUBLICATIONS

French Search Report dated Mar. 9, 2010 for corresponding French Application No. FR 0954361, filed Jun. 25, 2009.

* cited by examiner

*Primary Examiner* — Alpus J Hsu
*Assistant Examiner* — Walter Divito
(74) *Attorney, Agent, or Firm* — David D. Brush; Westman, Champlin & Kelly, P.A.

(57) ABSTRACT

A method is provided of obtaining information representative of an availability of a communications network, which includes a plurality of equipment exchanging routing data in accordance with a routing protocol. The method includes a stage of storing in chronological order at least some of the routing data exchanged between at least one first equipment and at least one second equipment; a stage of totaling unavailability times as a function of the routing data stored in chronological order for a predetermined time period; a stage of obtaining the information representative of an availability for the time period as a function of the totaled unavailability times.

7 Claims, 4 Drawing Sheets

METHOD OF OBTAINING INFORMATION REPRESENTATIVE OF AN AVAILABILITY, A DEVICE FOR OBTAINING INFORMATION, AND A CORRESPONDING COMPUTER PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of communications networks. The present disclosure relates more particularly to determining communications network availability.

The primary vocation of a communications network is to route data from one or more sources to one or more destinations. It is generally managed by a telecommunications operator offering customers network services. The customers may be users or service providers.

The availability of a communications network can be defined as the percentage of time in a given time period during which a packet entering any routing equipment of the communications network is able to reach its destination in the same network.

Other definitions of availability exist, for example the percentage of time in a given time period of routing equipment unavailability relative to the number of communications network equipment.

Communications networks evolve regularly to take account of administrative, commercial, and technical requirements. Users (for example Internet surfers) and new services offered by service providers (on-demand video, voice over IP) are increasingly demanding in terms of network quality and performance. The administrative authorities also impose constraints on telecommunications operators in some circumstances in order for them to comply with certain requirements. To comply with those requirements, telecommunications operators evolve their networks, which evolution is accompanied by a major increase in network complexity. It is therefore important for a telecommunications operator (like an Internet service provider) to know the availability of their network, as much to improve it as to promote it to customers or commercial partners on the basis of its good performance.

BACKGROUND OF THE DISCLOSURE

Mechanisms exist for evaluating communications network availability. These mechanisms are based on detecting and evaluating paths. Data in transit in a communications network is routed via paths, which paths are like routes leading from a source to a destination.

A path to be taken within a network to route data from the source to the destination may be learned in different ways, including:

manually, if each communications network equipment has a static input indicating for each destination the direction in which said equipment must relay received data; this method is not in very widespread use and is often unsuitable for large IP networks; and automatically, if the communications network equipment use one or more routing protocols: an equipment communicates to its neighbors its local topological knowledge of the network and the addresses that it knows how to reach; it receives in a symmetrical way the same type of information from its neighbors; metrics, i.e. weights, are defined on each link of a communications network; these metrics are the basis for constructing all paths and they enable the equipment to route or transfer a data packet to a destination using the path of lowest weight (this method is called the shortest path first (SPF) method); data of this type in transit between the equipment is called routing data.

In order to respond quickly in the event of path failure or unavailability, and thus improve availability, modern communications networks therefore learn paths dynamically using routing protocols: as soon as an event occurs in a network, all the network equipment are informed and can thus take the individual decisions necessary to reroute the data via a valid alternative path.

This change is not immediate, however, in particular because inertia affects the propagation of information between the communications network equipment, and moreover it is not certain that there will be another path that is available for routing the data.

The most widely used routing protocols are link-state protocols such as the Intermediate System to Intermediate System (IS-IS) protocol and the Open Shortest Path First (OSPF) protocol.

Telecommunications operators use one or more of the following techniques to find out how long the network has not been able to satisfy the data routing requirement correctly:

collecting alarms from network equipment, with the aim of determining the times of unavailability of paths and/or equipment;

using equipment at various places in the network to inject test data for sending to other equipment in order to calculate the time during which no information has been received; and collecting available traffic counts in each equipment giving the variations in transported traffic quantity on each network path.

Those techniques have their drawbacks.

Collecting alarms from equipment assumes that those equipment are in a position to send alarms. When an equipment is faulty or down, it is generally not in a position to transmit alarms signaling its own unavailability. The unavailability of an equipment is therefore detected by neighbors of that equipment that are capable of sending at least some of these alarms. Moreover, processing alarms is a task of lower priority than processing for rerouting data. Such a situation induces latency times in sending unavailability information and makes it impossible to determine accurately the time during which the equipment was really unavailable.

Injecting test data is not sufficiently accurate because the test data is not injected continuously, in order to avoid overloading or congesting the network. Thus the real availability of the network is not obtained with the aid of such injection because it may very well be that data is injected at times at which there is total availability and failure of a path or equipment occurs immediately afterwards. The nevertheless real unavailability of the equipment or path is therefore missed.

Moreover, that technique requires the use of numerous injection equipment and consumes network resources uselessly.

The use of traffic counts also induces a latency time in sending information and an unacceptable lack of accuracy. It is not entirely impossible to envisage a functional equipment failing to route any traffic. Such a situation may arise if a metric (i.e. a weight) associated with a path is too high compared to a plurality of usable other paths, with the result that the equipment does not route any traffic because the weight of the paths passing through it is too high.

Thus prior art techniques give rise to problems of accuracy when calculating availability. Those accuracy problems can lead to erroneous interpretation of the availability of a communications network and to decisions being made regarding the architecture of the communications network that are not appropriate, given the real problems of the communications network.

SUMMARY

An exemplary aspect of the present disclosure relates to a method of obtaining information representative of the availability of a communications network comprising a plurality of equipment exchanging routing data in accordance with a routing protocol.

According to an aspect of the disclosure, such a method comprises:
- a stage of storing in chronological order at least some of said routing data exchanged between at least one first equipment and at least one second equipment;
- a stage of totaling unavailability times as a function of said routing data stored in chronological order for a predetermined time period; and
- a stage of obtaining said information representative of an availability for said time period as a function of said totaled unavailability times.

Thus an aspect of the disclosure makes it possible to use the routing data exchanged between the communications network equipment to determine accurately the unavailability (or the availability) of the communications network. This routing data is accurate data that is exchanged virtually immediately between the routing equipment to calculate the routes leading from a source to a destination.

The routing data makes it possible to define data transmission paths between a plurality of sources and a plurality of destinations within said communications network.

The use of this routing data is therefore more effective than using alarms or injecting test data because firstly the alarm latency time is not taken into account and secondly new data is not used that would otherwise consume network resources uselessly. The routing data is stored in chronological order, i.e. a history of the routing data is saved. This is referred to below as chronological storage.

The routing protocol is a link-state protocol, for example, such as the IS-IS or OSPF protocol.

In one particular implementation, said stage of storing in chronological order comprises:
- a step of capturing routing data relating to at least one neighborhood between at least two routing equipment of said communications network;
- a step of comparing said captured routing data with data previously stored in chronological order concerning an identical neighborhood; and
- a step of storing said captured routing data in chronological order if said comparison step indicates a difference.

Thus in one or more examples, the method enables chronological storage of neighborhood change data that circulates between the equipment of the communications network. This chronological storage, by storing routing data in chronological order, makes it possible to create a chronological routing table that can be used to determine unavailability of the communications network.

According to a particular feature of an exemplary embodiment, said chronological order storage step includes a step of adding data representative of a date and/or a time to said captured routing data to form at least one time-stamped record and a step of storing said at least one time-stamped record in a database.

In one particular implementation, said totaling stage comprises, for said predetermined time period:
- a step of determining at least some of the available paths of said communications network at the start of said time period; and
- for each of the previously-determined paths, a step of totaling said unavailability times comprising:
  - a step of adding a fixed unavailability time when a path between a source and a destination changes following a link loss;
  - a step of adding a variable unavailability time if routing between a source and a destination is impossible, corresponding to an unavailability time determined using said data stored in chronological order.

According to a particular feature, for example, said stage of obtaining said information representative of an availability Disp comprises a step of calculation according to the following formula:

$$Disp = 1 - \frac{\sum Indsp}{T \times NCh}$$

in which:
- $\sum Indsp$ is the sum of the unavailabilities (in seconds) for said predetermined time period;
- T is the total number of seconds in said time period; and
- NCh is the total number of paths in the communications network.

According to a particular feature, for example, said routing data consists of link-state packets setting up and maintaining adjacency information between neighboring routing equipment of said communications network.

Another aspect of the disclosure relates to a device for obtaining information representative of an availability of a communications network comprising a plurality of equipment exchanging routing data. According to an example, such a device comprises:
- means for storing in chronological order at least some of said routing data exchanged between at least one first equipment and at least one second equipment;
- means for totaling unavailability times as a function of said routing data stored in chronological order for a predetermined time period; and
- means for obtaining said information representative of an unavailability for said time period as a function of said totaled unavailability times.

According to a particular feature, for example, said device is declared a neighbor of a routing equipment of said communications network in order for said routing equipment to send said routing data to said device.

Another aspect of the disclosure relates to routing equipment comprising a device as described above for obtaining information representative of availability.

Another aspect of the disclosure relates to a computer program downloadable from a communications network and/or stored on a medium readable by a computer and/or executable by a microprocessor and comprising program code instructions for implementing the method of obtaining information as described above.

BRIEF DESCRIPTION OF THE DRAWINGS

Other features and advantages become more clearly apparent from the following description of an implementation of the disclosure provided by way of non-limiting illustrative example only and from the appended drawings, in which.

DETAILED DESCRIPTION OF ILLUSTRATIVE EMBODIMENTS

1. Introduction

Figure 1:
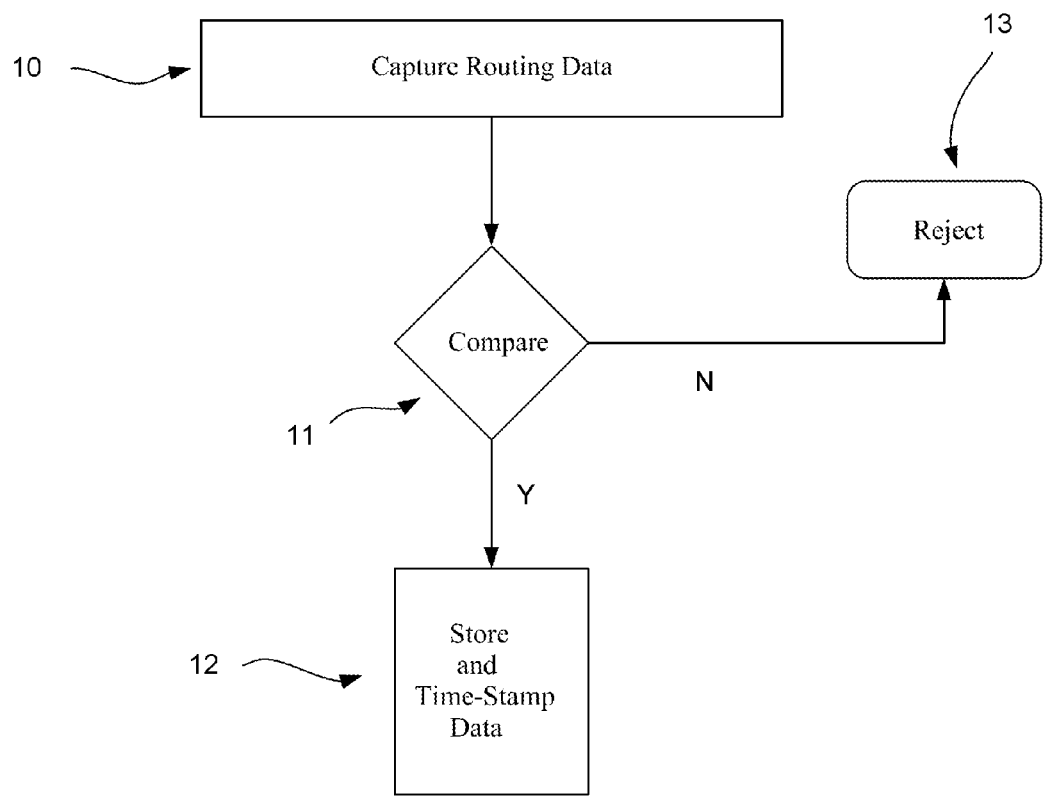
FIG. 1 is a block diagram of the stage of storing routing data in chronological order in one particular implementation.

A method according to a particular example of the disclosure makes it possible to obtain communications network availability information quickly without having to make major modifications in the network and without swamping the network with new data hungry for resources. For example, the method uses existing data already in transit in the communications network. This data is the routing data that the equipment constituting the network send one another. The equipment uses this routing data to define data transmission paths. The inventors have had the ingenious idea of using this routing data to determine communications network availability. This data cannot a priori be used for this purpose since it does not have the necessary characteristics. The inventors have therefore had the idea of adding data thereto, enabling a history of received routing data to be created to enable subsequent calculation of availability for a given period. This is referred to as storage in chronological order or chronological storage.

The availability of a communications network is linked to the fact that the network has been able to converge toward a stable state. A network has converged toward a stable state when all the equipment of said network are capable of routing data to the correct destination. This convergence is made possible by the routing data carried by routing protocols responsible for announcing events.

The general principle of an illustrative embodiment therefore relies on storing data carried by the routing protocols and adding thereto data (for example a date and a time) enabling it to be stored chronologically with the aim of using the data for network availability calculations. Such storage is referred to as storage in chronological order or more generally as chronological storage. The routing data is captured and stored in chronological order for subsequent processing to enable information to be obtained representative of availability, for example a percentage availability during a given period or the number of equipment unavailable during a given period.

According to an example, such chronological storage may be effected in a dedicated equipment known as a probe. This is not essential, however, and it is entirely feasible to assign this chronological storage capacity to some particular network equipment. More particularly, a router may be modified to be able to use the method of the disclosure, for example.

Likewise, chronological storage need not be confined to a single equipment or a single probe and it is possible to provide a probe for each administrative domain of the communications network (i.e. each subnetwork) to calculate the availability of the subnetworks independently and then combine those availabilities to obtain an overall availability of the communications network (for example by producing a mean availability or by taking the lowest value of all the availabilities as the overall availability of the network).

There is described below the particular situation of implementing the method using link-state packets as used by protocols such as the IS-IS and OSPF protocols. It is nevertheless clear that the invention is not limited to this particular technology and that it may be implemented using any type of routing data in a meshed network in which routing equipment exchange this type of data.

2. Description of One Implementation

The implementation of this method is used in a communications network in which the messages exchanged between data routing equipment are link-state messages. In this implementation, calculating communications network availability is based on characterizing the information carried by the routing protocols. More particularly, for each link-state packet received by equipment implementing the method, the method compares the received data with data received in a preceding link-state packet. If any information concerning the state or the metric of links or routers changes, then the received packet is kept (or at the very least the changes are kept).

By means of the packets (or the first packets and the list of changes if the changes between packets is the only data kept), the method makes it possible to reconstitute in time a routing table known as the routing information base (RIB) of each routing equipment of the communications network. This reconstitution of the RIB of an equipment makes it possible to determine whether a router has changed the path for transferring IP packets to their destination and if such a destination is still available. This is explained in more detail below.

A packet reaches its destination only if a first router knows how to transfer it to a second router, which itself then transfers it to a third router, and so on until it reaches its destination; the method reconstitutes the RIB at a given time t and therefore makes it possible to determine whether a path from a source router S to a destination router D exists, no longer exists, or has changed (for example because of an equipment failure).

When this calculation is carried for all possible {S,D} router pairs of the network, the numbers of paths that are available, unavailable, or impacted by a change of routing at this time t are known.

The ratio between the available paths (including the routing changes) and the total number of possible paths gives the percentage of paths available at time t. Calculating the paths at time t and comparing them with the paths at time t−1, gives the availability over the time interval ]t−1,t]. By repeating this calculation for each fixed time interval ]t−1,t] until the whole of a period under study has been covered, and by averaging the percentages, an example of the method makes it possible to obtain the average availability of the network, i.e. the percentage of time during which a packet entering any router of the communications network is able to reach its destination in the same network.

One difficulty with this first approach is that, at first sight, it leads to having to effect path percentage calculations for time intervals of a few milliseconds or microseconds, for example because of the data refreshing mechanisms. Such calculations may not be efficacious. To limit the calculations and obtain a result that consumes fewer resources, the inventors have had the idea of another chronological storage technique yielding the same result and consisting in effecting these calculations only at times at which changes are stored, a change being detected with the aid of packets called non-refresh packets of data that contains topological modifications.

In the above-mentioned protocols there exist packets that make it possible to send routing data to the neighbor of a given router at regular intervals, even if no modification has occurred in the meantime. These packets are called refresh packets. Knowing that no change occurs between two non-refresh packets, it suffices to effect the calculations only on receiving non-refresh packets at time t and weighting the percentage availability of the time interval by the duration of the interval as a proportion of the total time of the period under study to be able finally to average the availability and obtain the same result as before.

By extension, and if necessary (because of multiply connected customers, more sensitive routers, etc.), it is possible to apply this weighting technique to specific routers or paths in order to obtain a more personalized availability.

Figure 2:
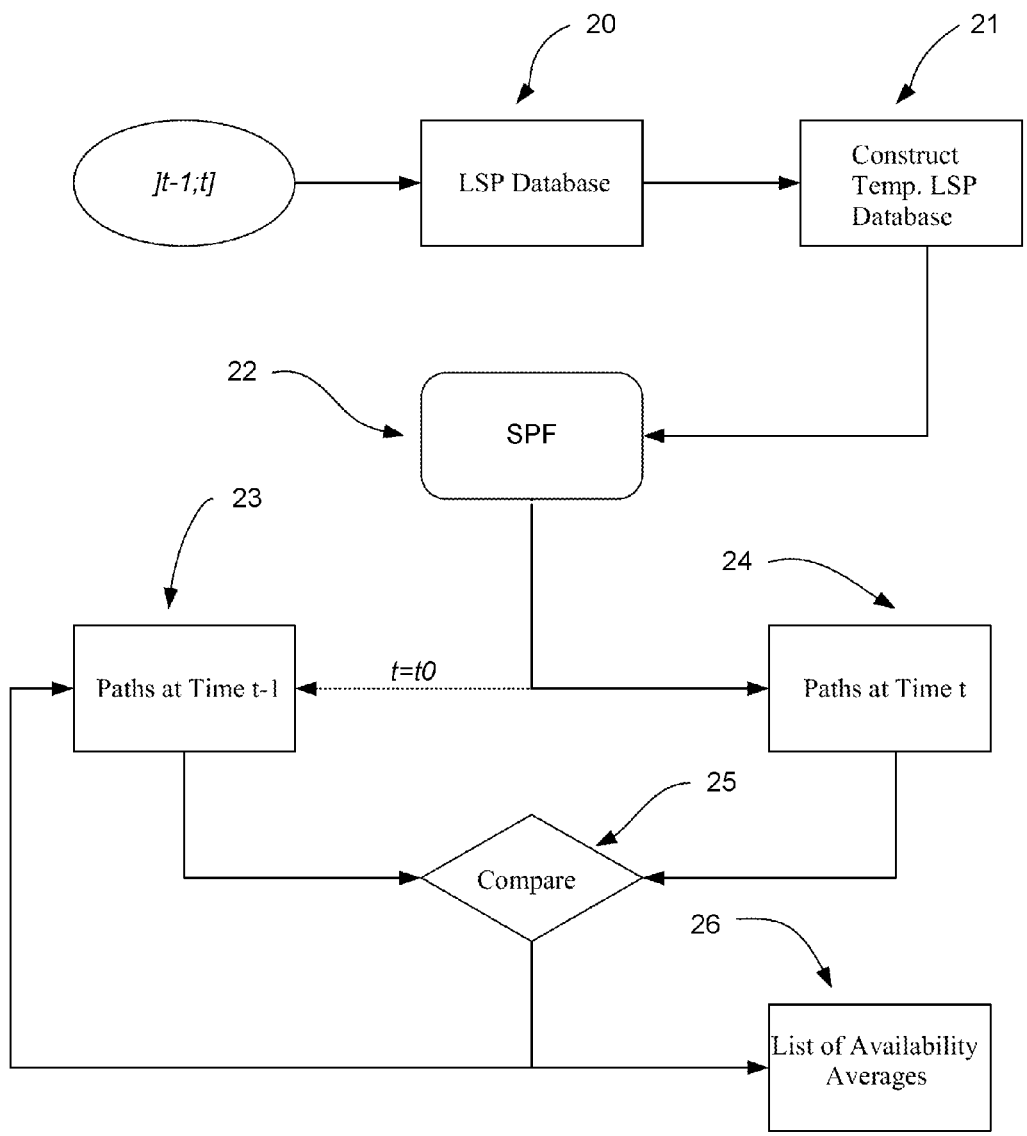
FIG. 2 illustrates a method of processing data stored in chronological order in one particular implementation.

A chronological storage stage of one particular implementation of the method is described with reference to FIG. 1. The method comprises:

a step 10 of capturing data in the form of a link-state packet representative of a routing; this packet is sent from a first routing equipment to a second equipment, e.g. the probe or another routing equipment adapted to use the method;

a step of storing this link-state packet, possibly temporarily, not shown in FIG. 2;

a step 11 of comparing this link-state packet with at least one other link-state packet linked to the same routing equipment;

a step 12 of storing and time-stamping this link-state packet if the data that it contains has been modified relative to the corresponding previously-received packet;

a step 13 of rejecting this link-state packet if none of the data that it contains has been modified compared to the corresponding previously received packet.

FIG. 2 is a diagram of a method of calculating availability based on chronological storage.

For a predetermined period (for example 24 hours) following the chronological storage stage (see FIG. 1), there is available a database 20 of routing packets (link-state packets (LSP)) resulting from step 12. Using this database 20, a temporary database 21 is constructed containing the LSP used at time t to construct the RIB of each router updated at time t. This database 21 therefore reflects the state of the network at time t.

The LSP updated in the database 21 are fed to a component 22 effecting the SPF calculation, like the routers of the network, and returning a list of the shortest paths as a function of the LSP supplied. For each time t (at which there have been routing modifications), the shortest paths are inserted into a database 24 that lists the paths available at time t. When t=t0, the shortest paths are at the same time inserted into a database 23 that contains the paths at time t−1. For each time t, an appropriate component 25 compares the paths available at time t and those available at time t−1, which totals the successive unavailabilities over the time interval ]t−1,t]. It is to be noted that rerouting and total disappearance of connectivity do not have the same impact at the unavailability level. This is explained in detail below. This counting is stored in a list 26 of availability averages. The data at time t then replaces the data at time t−1 in the database 23 and the totaling continues on going to the next time interval, until the whole of the predetermined time period (for example 24 hours) has been covered.

Thus, generally speaking, this method includes a stage of totaling successive unavailabilities using the chronologically stored link-state packets and a stage of calculating availability using the totaled unavailabilities.

The stage of totaling unavailabilities more particularly includes, for each initially defined path of the communications network and for each chronologically stored packet concerning that path:

a step of verifying a difference between a current routing and a preceding routing delivering information representative of a difference;

a step of adding a fixed unavailability time if said information representative of a difference indicates a routing difference following a link loss; and a step of adding a variable unavailability time corresponding to the time separating the chronologically stored packet from the preceding packet if said information representative of a difference indicates the absence of a preceding routing.

In other words, the stage of unavailability totaling consists in summing the various unavailabilities of the communications network using firstly link-state packet paths, which make it possible to detect the routing differences and to assign for given data an unavailability time that is fixed and that corresponds to the propagation of a new path in the network, and secondly an unavailability time that is variable as a function of the time-stamping if link absence permanently cuts off access to a routing equipment.

The stage of calculating the mean final availability Disp uses the following formula:

$$Disp = 1 - \frac{\sum Indsp}{T \times NCh}$$

in which:

$\Sigma Indsp$ is the sum of unavailabilities (in seconds);

T is the total number of seconds in the period concerned; and

NCh is the total number of paths in the communications network.

This solution has several advantages. Compared to the method that recovers alarms, it is more accurate in time (virtually immediate reaction of the protocol versus a non-deterministic processing delay in the routers) and more reliable (if a router goes down, it cannot send alarms, whereas using the routing protocol intelligently enables its neighbors to signal the drop out immediately). The time accuracy is even greater in this method compared to the method based on totaling traffic counters because in this method the router announces a change as soon as it occurs whereas in that method the states are queried at regular time intervals, which introduces smoothing of events in that interval. Finally, compared to the method using probes to inject traffic into the network, this method is less costly in terms of bandwidth use and deployment because a single protocol probe can monitor the network, whereas many probes are needed to supervise all the traffic paths.

The down side of this method is the need to set up communication with a network router to recover the data. The induced load is minimal, however, but it does assume the intervention of an authority having administrator rights for the domain.

3. Example of Use

An example of use of the techniques disclosed herein as applied to an IP communications network comprising four routers EA, EB, EC, and ED using the IS-IS protocol is described below with reference to FIGS. 3A, 3B, and 3C. Within this network, routers EA, EB, and EC are directly interconnected, i.e. there exists a direct path making it possible to reach EA directly from EB and EC, a direct path making it possible to reach EB from EA and EC, and a direct path making it possible to reach EC from EB and EA. For its part, the router ED is directly connected only to the router EC. It is therefore necessary to go via the router EC to reach the router ED from the router EA or EB. An IS-IS protocol link is represented by two oriented adjacencies interconnecting two routers bidirectionally. Each interconnection between two routers has a metric making it possible to indicate a weight associated with the interconnection. Thus the weight for going directly from EA to EC is 4, for example, and the weight for going from EA to EB is 1.

Figure 3A:
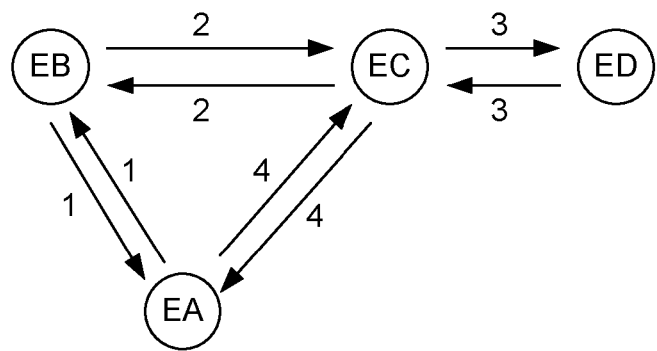
FIGS. 3A, 3B, and 3C show the states of links between routing equipment in the method of one particular implementation.
Figure 3B:
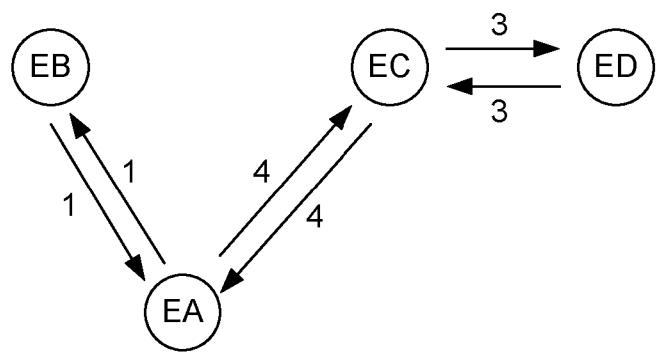
Figure 3C:
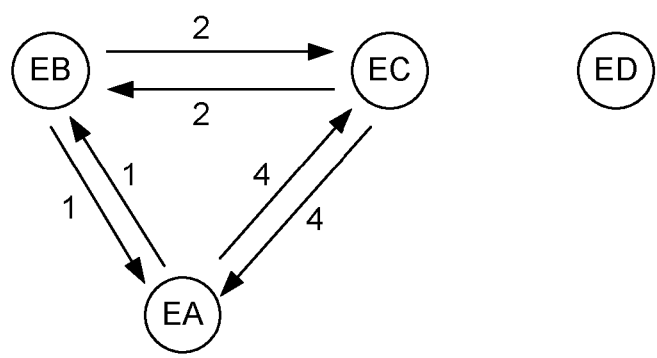

In this example, a probe SA, not shown in FIGS. 3A, 3B, 3C, is connected to the router EA and is declared to be an IS-IS neighbor of EA. The IS-IS protocol covers link-state packets (LSP). The probe SA, in as much as it is an IS-IS neighbor of EA, then receives therefrom LSP that the router EA receives and sends.

In this example, it is also considered that over a time interval of one day running from 0h00 to 23h59 the link between EB and EC is unavailable from 15h00 to 15h10 and then the link between EC and ED is unavailable as from 23h55.

The probe SA receives the following LSP at the following times:

| Time | Source | Content |
|---|---|---|
| 0h00 | LSP of EA | EB neighbor of EA (metric 1) |
|  |  | EC neighbor of EA (metric 4) |
| 0h00 | LSP of EB | EA neighbor of EB (metric 1) |
|  |  | EC neighbor of EB (metric 2) |
| 0h00 | LSP of EC | EA neighbor of EC (metric 4) |
|  |  | EB neighbor of EC (metric 2) |
|  |  | ED neighbor of EC (metric 3) |
| 0h00 | LSP of ED | EC neighbor of ED (metric 3) |
| 15h00 | LSP of EB | EA neighbor of EB (metric 1) |
| 15h00 | LSP of EC | EA neighbor of EC (metric 4) |
|  |  | ED neighbor of EC (metric 3) |
| 15h10 | LSP of EB | EA neighbor of EB (metric 1) |
|  |  | EC neighbor of EB (metric 2) |
| 15h10 | LSP of EC | EA neighbor of EC (metric 4) |
|  |  | EB neighbor of EC (metric 2) |
|  |  | ED neighbor of EC (metric 3) |
| 18h00 | LSP of EA | EB neighbor of EA (metric 1) |
|  |  | EC neighbor of EA (metric 4) |
| 23h55 | LSP of EC | EA neighbor of EC (metric 4) |
|  |  | EB neighbor of EC (metric 2) |

In this example, sending packets at 18h00 has been introduced to show that the method updates (refreshes) the data.

Applying the method of the according to an example of the disclosure produces nine chronological storage records (of the ten different LSPs received in succession):

The LSP of EA of neighbors that are EB (metric 1) and EC (metric 4) is received at 0h00. There is no preceding version of the LSP, it is therefore stored and time-stamped at 0h00.

The LSP of EB of neighbors that are EA (metric 1) and EC (metric 2) is received at 0h00. There is no preceding version of the LSP, it is therefore stored and time-stamped at 0h00.

The LSP of EC of neighbors that are EB (metric 2), EA (metric 4), and ED (metric 3) is received at 0h00. There is no preceding version of the LSP, it is therefore stored and time-stamped at 0h00.

The LSP of ED of neighbor that is EC (metric 3) is received at 0h00. There is no preceding version of the LSP, it is therefore stored and time-stamped at 0h00.

The LSP of EB of neighbor that is EA (metric 1) is received at 15h00. Relative to the preceding LSP sent by EB, a neighbor is lacking. This LSP is therefore stored and time-stamped at 15h00.

The LSP of EC of neighbors that are EA (metric 4) and ED (metric 3) is received at 15h00. Relative to the preceding LSP sent by EB, a neighbor is lacking. This LSP is therefore stored and time-stamped at 15h00.

The LSP of EB of neighbors that are EA (metric 1) and EC (metric 2) is received at 15h10. There is an additional neighbor relative to the preceding sending (15h00). The LSP is therefore stored and time-stamped at 15h10.

The LSP of EC of neighbors that are EB (metric 2), EA (metric 4), and ED (metric 3) is received at 15h10. There is an additional neighbor relative to the preceding sending (15h00). The LSP is therefore stored and time-stamped at 15h10.

The LSP of EA of neighbors that are EB (metric 1), and EC (metric 4) is received at 18h00. The LSP is no different from the LSP previously saved, it is therefore not stored.

The LSP of EC of neighbors that are EB (metric 2) and EA (metric 4) is received at 23h55. There is a neighbor (ED) lacking relative to the preceding sending. The LSP is therefore stored and time-stamped at 23h55.

From these nine records, the topology of the communications network is determined at t=t0=0h00:

12 paths are determined using the shortest path first (SPF) algorithm:
the direct path [EA,EB] from EA to EB;
the path [EA,EC] from EA to EC via EB;
the path [EA,ED] from EA to ED via EB and EC;
the direct path [EB,EA] from EB to EA;
the direct path [EB,EC] from EB to EC;
the path [EB,ED] from EB to ED via EC;
the path [EC,EA] from EC to EA via EB;
the direct path [EC,EB] from EC to EB;
the direct path [EC,ED] from EC to ED;
the path [ED,EA] from ED to EA via EC and EB;
the path [ED,EB] from ED to EB via EC;
the direct path [ED,EC] from ED to EC.

Because t=t0, comparison with the preceding paths returns an identical situation, and so 0 sec is added to t0 in the average unavailability database.

A starting point for the availability calculation has therefore been defined. It is based on 12 paths representative of the data transmission possibilities between the routing equipment that constitute the communications network. From this starting point, the following records are used (15h00, 15h10, 23h55 to determine the evolution of the RIB of the equipment and to deduce unavailabilities therefrom: here there are therefore four time intervals in the predetermined time period of 24h00: ]00h00-15h00], ]15h00-15h10], ]15h10-23h55], and ]23h55-23h59]).

The next time is t=15h00 (earlier than tmax=23h59), the shortest path first (SPF) calculations with the updated versions of the LSP of EB and EC remove the link EB-EC (in both directions).

By comparison with the preceding list of paths, there is a routing change on the eight paths [EB,EC], [EB,ED], [EA,EC], [EA,ED], [EC,EB], [ED,EB], [EC,EA], and [ED,EA] following the link loss. A fixed unavailability value (linked to the protocol convergence time, for which one value observed is 40 milliseconds (ms), for example) is then added to the list of unavailability averages for each path impacted, i.e. 320 ms (because there are eight impacted paths) and for the time interval ]t0, 15h00]. It is important to note that a fixed unavailability value is added that is linked to the effective use of each new path in the routing equipment concerned. There is a difference between link loss (loss of the link EB-EC here) and equipment loss. Here, even if the link is lost, it is still possible to reach all destinations using other paths. The routers nevertheless use an unavailable path (pointing toward the link that has disappeared) until the information is processed. There is therefore an unavailability only during the time to calculate the new paths.

The next time is t=15h10 (earlier than tmax=23h59), the shortest paths first (SPF) calculations with the updated versions of the LSP of EB and EC cause the link EB-EC to appear.

By comparison with the preceding list of paths, there is rerouting of the paths [EB,EC], [EB,ED], [EA,EC], [EA,ED], [EC,EB], [ED,EB], [EC,EA], and [ED,EA] following raising a link. Here, because a link is raised, 0 second of unavailability is added to the list of unavailability averages. Even though this also constitutes rerouting, the old path is still usable, and there is therefore no packet loss until switching to the new path.

The next time is t=23h55 (earlier than tmax=23h59), the SPF calculations with the updated versions of the LSP of EC cause the link EC-ED to disappear.

By comparison with the preceding list of paths, there is loss of routing of the paths [EB,EC], [EB,ED], [EA,EC], [EA;ED], [EC,EB], [ED,EB], [EC,EA], and [ED,EA] (because there is no path to reach ED other than via EC, with the result that routing to ED is impossible). In this situation, given that a routing existed beforehand, 0 second of unavailability is added to the list of unavailability averages.

There are no further events until tmax. By comparing the last list of paths with itself, it is seen that the paths [ED,EC], [ED,EB], [ED,EA], [EC,ED], [EB,ED], and [EA,ED] are still lost. There are therefore four minutes of unavailability to be added to the list of unavailability averages for each of the six paths, i.e. 1440 seconds in total.

It is then easy to calculate an average final availability Disp using the above formula, which in the preceding example gives 1 less the sum of the unavailabilities (i.e. 1440,320 sec) divided by the product of the total time interval (i.e. 23h59, or 86340 sec) and the total number of paths (i.e. 12). For this example the result is then equal to 99.86098%, which is a much more precise measurement than the measurements carried out previously using prior art methods.

It is thus clear that an example of the method takes more precise account of changes that occur in the communications network to determine its availability. It is equally clear that the metrics associated with the paths are important in chronological storage. In fact, assuming that in the preceding example the link EA-EC had disappeared at 15h00 (instead of the link EB-EC), this disappearance would not have led to any disturbance in the routing of the data. In fact, the metric associated with this link being 4, the disappearance would have had no effect on routing the data because this link was not used because of the excessively high metric. It is in fact more economical to take EA-EB-EC to go from EA to EC because the sum of the metrics is then 3 whereas direct transmission from EA to EC costs 4.

Thus, in contrast to prior art techniques based on alarms, an example of the method proposes a more realistic technique for calculating availability. The invention makes this possible by the chronological storage of the LSP that are transmitted between the network equipment.

4. Device for Obtaining Information

Figure 4:
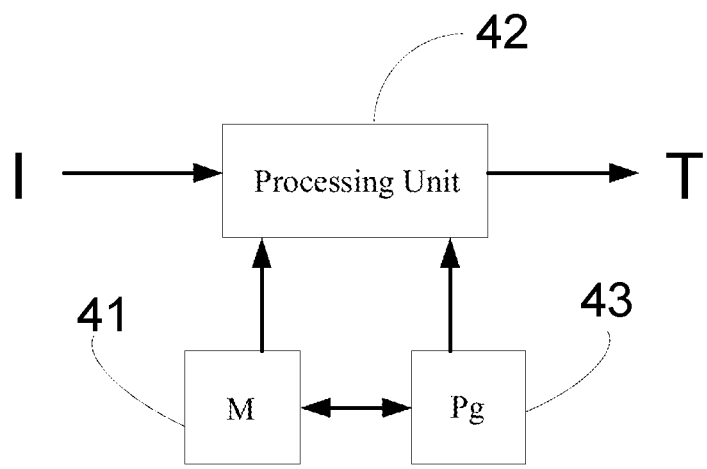
FIG. 4 shows the hardware architecture of a chronological storage device of one particular embodiment.

A device of one embodiment for obtaining information is described below with reference to FIG. 4. Such a device can be an application server such as that described above that can integrate one or more chronological storage databases for routing data.

Such a device includes a memory 41, consisting of a buffer memory, and a processing unit 42, equipped with a microprocessor P, for example, and controlled by a computer program 43 executing the method of obtaining information according to a particular example of the disclosure.

On initialization, the code instructions of the computer program 43 are loaded into RAM, for example, before being executed by the processor of the processing unit 42. The processing unit 42 receives as input at least information I, such as neighbor information coming from a routing equipment. The microprocessor of the processing unit 42 executes the steps of the method of obtaining information described above, in accordance with the instructions of the computer program 43, to deliver processed information T, such as the availability of the communications network for a given period. To this end the device includes, in addition to the buffer memory 41, means for storing in chronological order at least some of said routing data exchanged between at least some of the communications network equipment, means for totaling availability time as a function of said routing data chronologically stored for a given time period, and means for obtaining said information representative of an availability for said time period as a function of said totaled unavailability times.

The above means are controlled by the microprocessor of the processing unit 42.

Although the present disclosure has been described with reference to one or more examples, workers skilled in the art will recognize that changes may be made in form and detail without departing from the scope of the disclosure and/or the appended claims.

What is claimed is:

1. A method of obtaining information representative of an availability of a communications network comprising a plurality of routing equipment, including at least one first routing equipment and at least one second routing equipment, exchanging routing data in accordance with a routing protocol, wherein the method is carried out by a member of the plurality of routing equipment of said communication network and comprises:

a stage of storing in computer-readable memory in chronological order at least some of said routing data exchanged between the at least one first routing equipment of said communication network and the at least one second routing equipment of said communication network, wherein said at least some routing data comprises link-state packets setting up and maintaining neighbor information between neighboring ones of the plurality of routing equipment belonging to said communications network and enabling to define transmission paths between the at least one first routing equipment and the at least one second routing equipment belonging to said communications network;

a stage of totaling unavailability times as a function of said routing data stored in chronological order for a predetermined time period, wherein said totaling stage comprises:

a step of determining at least some available paths of said communications network at the start of said time period;

for each of the paths previously determined, a step of totaling said unavailability times comprising:

summing a fixed unavailability time when a path between a source and a destination changes following a link loss; and summing a variable unavailability time if routing between a source and a destination is impossible, corresponding to an unavailability time determined using said data stored in chronological order; and a stage of obtaining said information representative of an availability for said time period with a processor as a function of said totaled unavailability times.

2. A method according to claim 1, wherein said stage of storing in chronological order comprises:

a step of capturing routing data relating to at least one neighborhood between at least two of the routing equipment of said communications network;

a step of comparing said captured routing data with data previously stored in chronological order concerning an identical neighborhood; and a step of storing said captured routing data in chronological order if said comparison step indicates a difference.

3. A method according to claim 2, wherein said step of storing said captured routing data in chronological order includes a step of adding data representative of at least one of a date or a time to said captured routing data to form at least one time-stamped record and a step of storing said at least one time-stamped record in a database.

4. A method according to claim 1, wherein said stage of obtaining said information representative of an availability Disp comprises a step of calculation according to the following formula:

$$Disp = 1 - \frac{\sum Indsp}{T \times NCh}$$

in which:

$\Sigma Indsp$ is the sum of the unavailabilities in seconds for said predetermined time period;

T is the total number of seconds in said time period; and

NCh is the total number of paths in the communications network.

5. Routing equipment for obtaining information representative of an availability of a communications network comprising a plurality of routing equipment exchanging routing data, wherein the routing equipment comprises:

means for storing in chronological order at least some of said routing data exchanged between at least one first routing equipment of said communication network and at least one second routing equipment of said communication network using a routing protocol, wherein said at least some routing data comprises link-state packets setting up and maintaining neighbor information between neighbor routing equipment belonging to said communications network and enabling to define transmission paths between the at least one first routing equipment and the at least one second routing equipment of said communications network;

means for totaling unavailability times as a function of said routing data stored in chronological order for a predetermined time period, wherein said totaling comprises:

a step of determining at least some available paths of said communications network at the start of said time period;

for each of the paths previously determined, a step of totaling said unavailability times comprising:

summing a fixed unavailability time when a path between a source and a destination changes following a link loss; and summing a variable unavailability time if routing between a source and a destination is impossible, corresponding to an unavailability time determined using said data stored in chronological order; and means for obtaining said information representative of an unavailability for said time period as a function of said totaled unavailability times.

6. The routing equipment according to claim 5, which is declared a neighbor of another of the plurality of routing equipment of said communications network in order for said other routing equipment to send said routing data to said routing equipment.

7. A non-transitory computer-readable medium comprising a computer program stored thereon and including program code instructions for implementing a method of obtaining information representative of an availability of a communications network comprising a plurality of routing equipment, including at least one first routing equipment and at least one second routing equipment, exchanging routing data in accordance with a routing protocol, when the instructions are executed by a processor of a member of the plurality of routing equipment of the communication network, wherein the method comprises:

instructions configured to store in computer-readable memory in chronological order at least some of said routing data exchanged between the at least one first routing equipment of the communication network and at least one second routing equipment of the communication network, wherein said at least some routing data comprises link-state packets setting up and maintaining neighbor information between neighbor routing equipment belonging to said communications network and enabling to define transmission paths between the at least one first routing equipment and the at least one second routing equipment belonging to said communications network;

instructions configured to total unavailability times as a function of said routing data stored in chronological order for a predetermined time period, wherein totaling the unavailability times comprises:

a step of determining at least some available paths of said communications network at the start of said time period;

for each of the paths previously determined, a step of totaling said unavailability times comprising:

summing a fixed unavailability time when a path between a source and a destination changes following a link loss; and summing a variable unavailability time if routing between a source and a destination is impossible, corresponding to an unavailability time determined using said data stored in chronological order; and instructions configured to obtain said information representative of an availability with the processor for said time period as a function of said totaled unavailability times.

* * * * *